US012756238B2

(12) United States Patent
Yankowitz

(10) Patent No.: US 12,756,238 B2
(45) Date of Patent: Oct. 6, 2026

(54) AUTOMOTIVE CAR SEAT WIRELESS CHARGING SYSTEM

(71) Applicant: Yank Technologies, Inc., Brooklyn, NY (US)

(72) Inventor: Joshua Aaron Yankowitz, Brooklyn, NY (US)

(73) Assignee: Yank Technologies, Inc., Brooklyn, NY (US)

(*) Notice: Subject to any disclaimer, the term of this patent is extended or adjusted under 35 U.S.C. 154(b) by 931 days.

(21) Appl. No.: 17/905,476

(22) PCT Filed: Mar. 5, 2021

(86) PCT No.: PCT/US2021/021121
§ 371 (c)(1),
(2) Date: Sep. 1, 2022

(87) PCT Pub. No.: WO2021/178821
PCT Pub. Date: Sep. 10, 2021

(65) Prior Publication Data
US 2023/0187975 A1 Jun. 15, 2023

Related U.S. Application Data

(60) Provisional application No. 62/985,742, filed on Mar. 5, 2020.

(51) Int. Cl.
*H02J 7/00* (2026.01)
*B60N 2/90* (2018.01)
(Continued)

(52) U.S. Cl.
CPC ................ *H02J 50/23* (2016.02); *B60N 2/90* (2018.02); *B60R 16/03* (2013.01); *H02J 50/005* (2020.01);
(Continued)

(58) Field of Classification Search
CPC .......... H02J 50/23; H02J 50/005; H02J 50/12; H02J 50/40; H02J 50/402; H02J 50/80;
(Continued)

(56) References Cited

U.S. PATENT DOCUMENTS 9,876,379 B1 1/2018 Leabman et al.
2013/0005251 A1 1/2013 Soar
(Continued)

FOREIGN PATENT DOCUMENTS

CN 102318967 A 1/2012
CN 108370168 A 8/2018
(Continued)

OTHER PUBLICATIONS

ISA, International Search Report for International Application No. PCT/US2021/021121, Mail Date: May 19, 2021. 18 pages.
(Continued)

*Primary Examiner* — Zixuan Zhou
(74) *Attorney, Agent, or Firm* — Perkins Coie LLP

(57) ABSTRACT

Systems and methods for wirelessly charging one or more electronic devices in a vehicle (e.g., electronics in the vehicle seat or charging occupant devices from charging system embedded in the vehicle) are described. One method includes receiving a direct current (DC) signal from a power source, amplifying the received DC signal to generate an amplified alternating current (AC) signal, monitoring an internal signal in the power amplifier and adjusting one or more properties of the power amplifier in response to the monitored signal. The amplified AC signal is transmitted by one or more transmit antennas

15 Claims, 10 Drawing Sheets

(51) Int. Cl.

| | |
|---|---|
| ***B60R 16/03*** | (2006.01) |
| ***H02J 50/00*** | (2016.01) |
| ***H02J 50/12*** | (2016.01) |
| ***H02J 50/23*** | (2016.01) |
| ***H02J 50/40*** | (2016.01) |
| ***H02J 50/80*** | (2016.01) |
| *H02J 105/30* | (2026.01) |

(52) U.S. Cl.
CPC .............. *H02J 50/12* (2016.02); *H02J 50/40* (2016.02); *H02J 50/402* (2020.01); *H02J 50/80* (2016.02); *H02J 2105/30* (2026.01); *H02J 2207/20* (2020.01)

(58) Field of Classification Search
CPC .... H02J 2207/20; H02J 2310/40; B60N 2/90; B60R 16/03
USPC ..................... 320/108, 109; 307/104; 701/22
See application file for complete search history.

(56) References Cited

U.S. PATENT DOCUMENTS

| | | | | |
|---|---|---|---|---|
| 2013/0300358 | A1 | 11/2013 | Kirby et al. | |
| 2014/0252813 | A1 | 9/2014 | Lee et al. | |
| 2015/0160254 | A1 | 6/2015 | Huynh et al. | |
| 2015/0270719 | A1* | 9/2015 | Kurs | G06F 1/16 320/108 |
| 2015/0280451 | A1* | 10/2015 | Takeda | H02J 50/12 307/104 |
| 2016/0036262 | A1 | 2/2016 | Liao | |
| 2016/0329752 | A1 | 11/2016 | Bae | |
| 2017/0317528 | A1 | 11/2017 | Smith et al. | |
| 2017/0317529 | A1 | 11/2017 | Smith et al. | |
| 2018/0177075 | A1 | 6/2018 | Kweon et al. | |
| 2018/0262050 | A1 | 9/2018 | Yankowitz | |
| 2018/0294677 | A1 | 10/2018 | Yankowitz | |
| 2019/0068139 | A1 | 2/2019 | Kropfitsch et al. | |
| 2019/0214354 | A1 | 7/2019 | Soliman et al. | |
| 2019/0260238 | A1* | 8/2019 | Cho | H02J 50/12 |
| 2020/0266668 | A1 | 8/2020 | Yankowitz | |
| 2021/0083519 | A1* | 3/2021 | Yamamoto | H02J 50/12 |

FOREIGN PATENT DOCUMENTS

| | | |
|---|---|---|
| JP | 2003-284264 | 10/2003 |
| JP | 2018/532369 A | 11/2018 |
| JP | 2019-525696 | 9/2019 |
| JP | 2019-204881 | 11/2019 |
| KR | 20160071478 | 6/2016 |
| WO | 2017/004973 | 3/2017 |
| WO | 2019/225351 A1 | 11/2019 |

OTHER PUBLICATIONS

Official Action for co-pending Korean Application No. 10-2022-7034634, dated Apr. 10, 2025, 12 pages with Google English translation.
Extended European Search Report for co-pending EP Application No. 21765408.6, dated Mar. 4, 2024, 9 pages.
Official Action for co-pending Japanese Application No. 2022-552813, dated Dec. 2, 2024, 17 pages with unofficial English translation.
Official Action for co-pending Canadian Application No. 3,174,084, dated Nov. 4, 2024, 5 pages.
Official Action for co-pending Canadian Application No. 3,174,084, dated Jan. 15, 2024, 6 pages.
Official Action for co-pending Canadian Application No. 3,174,084, dated Aug. 22, 2025, 8 pages.
Official Action for co-pending Mexican Application No. MX/a/2022/010871, dated Jul. 11, 2025, 14 pages with Google translation.
JPO, Notice of Allowance for Japanese Application No. 2022-552813, mailed on May 19, 2025, 3 pages with unofficial English translation.
Official Action for co-pending Israeli Application No. 296098, dated Apr. 24, 2025, 4 pages.
First Examination Report for co-pending IN Application No. 202247055128, dated May 15, 2024, 6 pages.
First Examination Report for co-pending Australian Application No. 2021231865, dated Oct. 14, 2025, 4 pages.
Substantive Examination Report for co-pending Indonesian Application No. P00202210927, dated Dec. 19, 2025, 6 pages with unofficial English translation.
Office Action for Korean Application No. 10-2022-7034634, mailed on Dec. 16, 2025, 8 pages with unofficial English translation.
Office Action for Brazilian Application No. BR112022017664-3, mailed on Dec. 16, 2025, 5 pages with unofficial English translation.
Hearing Notice for Indian Application No. 202247055128, mailed on Dec. 12, 2025, 2 pages.
Office Action for co-pending Israeli Patent Application No. 296098, dated Apr. 28, 2026, 5 pages.
Communication pursuant to Article 94(3) EPC for European Patent Application No. 21 765 408.6, dated May 15, 2026, 16 pages.
Office Action for Co-Pending Chinese Patent Appl. No. 202180028540.9, dated Mar. 10, 2026, 20 pages with unofficial English translation.

* cited by examiner

AUTOMOTIVE CAR SEAT WIRELESS CHARGING SYSTEM

RELATED APPLICATIONS

This application is a 371 National Phase Application of PCT Application No. PCT/US2021/021121 entitled "AUTOMOTIVE CAR SEAT WIRELESS CHARGING SYSTEM" filed on Mar. 5, 2021, which claims priority to and benefit from U.S. Provisional Patent Application No. 62/985,742, entitled "AUTOMOTIVE CAR SEAT WIRELESS CHARGING SYSTEM," filed on Mar. 5, 2020, which is hereby incorporated by reference in its entirety.

BACKGROUND

As vehicle interiors change with advances in vehicle design, there is a need to incorporate flexible and efficient wireless charging systems into future vehicles.

BRIEF SUMMARY

Various designs of vehicle console wireless charging systems are described.

In one aspect, disclosed technology provides a system and method for retrofitting a wireless charging system inside a vehicle's floor panel to charge the electronics in a vehicle seat (e.g., car seat) thereby allowing for the elimination of some of the vehicle's wiring harnesses. The wireless charging system transmitter can also be retrofitted inside the vehicle seat for wirelessly charging passenger devices.

In another aspect, a wireless charging system for a vehicle seat of a vehicle, includes a first transmitter coupled to a power source of the vehicle, wherein the first transmitter comprises an amplifier coupled to one or more transmitter antennas; a first receiver embedded in the vehicle seat of the vehicle, wherein the first receiver comprises one or more receiver antennas wirelessly coupled to the one or more transmitter antennas to receive power wirelessly from the first transmitter; a rectifier circuit coupled to the one or more receiver antennas, wherein the rectifier circuit is configured to convert an alternating current to a direct current; and, a regulator circuit coupled to the rectifier circuit, wherein the regulator circuit is configured to generate a constant output voltage.

In another aspect, a method for wirelessly charging one or more electronic devices in a vehicle includes receiving a direct current (DC) signal from a power source; amplifying, by a switching power amplifier, the received DC signal to generate an amplified alternating current (AC) signal; monitoring, by a detector circuit, an internal signal in the power amplifier; adjusting, by a controller, one or more properties of the power amplifier in response to the monitored signal; and, transmitting, by one or more transmitter antennas, the amplified AC signal.

These, and other, aspects are disclosed throughout the document.

DETAILED DESCRIPTION

The disclosed technology provides systems and methods for designing or retrofitting a wireless charging system inside a vehicle's floor panel to charge the electronics in a vehicle seat thereby allowing for the elimination of some of the vehicle's wiring harnesses. The wireless charging system transmitter can also be contained inside the vehicle seat for wirelessly charging of electronic devices (e.g., passenger devices). The disclosed technology can be used in car seats and in seats or other driver/passenger occupant restraints in other vehicles including private passenger motor vehicles, commercial motor vehicles (e.g., buses), airplanes, trains, boats and other watercraft, and other modes of transport or locomotion such as motorcycles, bicycles, wagons, agricultural equipment such as tractors, industrial equipment such as forklifts, etc.

As the interiors of vehicles continue to change with the advancement of technologies like artificial intelligence, original equipment manufacturers (OEMs) are redesigning the interiors of vehicles to include new product features. For example, with self-driving vehicles, it would not be necessary for the driver to face the front of the vehicle. Therefore, an example feature can be to have the seats rotate so the driver can interact with other passengers in the back of the vehicle. However, this would be arduous to implement with current vehicles because of the wiring harnesses in the interior of the car. If the seat electronics (i.e., electronic devices embedded in the vehicle seat or otherwise electronically controlling seat functions), such as fans (e.g., SVS fans), sensors, and actuators, were able to be wirelessly charged, then the seat would be easier to remove or rotate. There is therefore a need for a system and method for charging vehicle electronics and passenger devices within the interior of the car that overcomes these and other challenges.

Various embodiments of the disclosed technology will now be described. The following description provides specific details for a thorough understanding and an enabling description of these embodiments. One skilled in the art will understand, however, that the invention can be practiced without many of these details. Additionally, some well-known structures or functions may not be shown or described in detail, to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
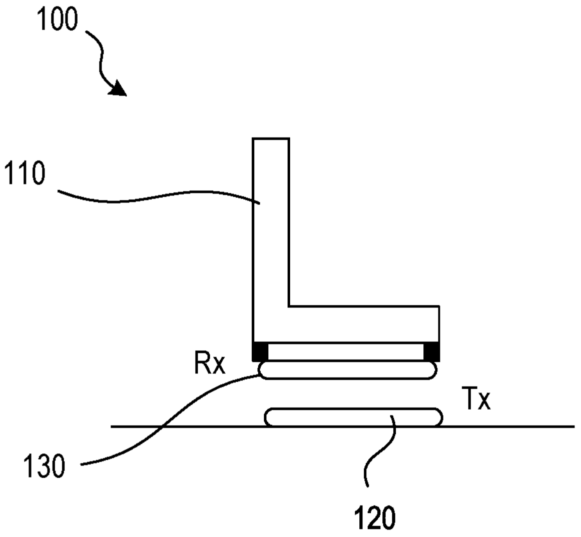
FIG. 1 is a representative illustration of a wireless charging vehicle seat system.

FIG. 1 is a representative illustration of a wireless charging vehicle seat system 100. In system 100, a single transmitter antenna (Tx) 120 is placed on or in the floor of the vehicle and a receiver (Rx) 130 is embedded into the vehicle seat 110. The transmitter 120 consists of an amplifier, which converts a DC signal to an amplified AC signal which is driven to a resonating antenna at radio frequencies. This antenna then wirelessly couples to a receiver antenna in receiver 130 inside the vehicle seat at approximately the same resonant frequency. The amplifier drives a signal to resonant capacitors which substantially excide one or more transmitter antennas into resonance. The amplifiers operating frequency is approximately equal to the resonant frequency of the antenna or antennas.

Receiver 130 includes an alternating-current to direct-current (AC/DC) converter and a voltage regulator for the voltage inputs of various electronic systems in the seat, for example, the fans, sensors, actuators, and motors. This allows the vehicle OEM to potentially eliminate portions of the wiring harness in the vehicle, and include new features, such as removable vehicle seats for a wider range of vehicle interior layouts, and rotating seats. The transmitter antenna and the receiver antenna can be planar antennas, electrodeposited antennas electrodeposited directly onto a vehicle seat part or floor panel, or three-dimensional antennas.

In one embodiment, a three-dimensional antenna can be a surface spiral coil comprising a continuous conductor with no breaks or radio frequency discontinuities wound around a dielectric material at an angle to diminish the proximity effect at an operational frequency of the wireless charging transmitter device, and to maintain a high intrinsic quality factor ("Q") of the surface spiral coil at the operating frequency. The conductor can have a thickness of around 10 um to 40 um. A three-dimensional antenna can be utilized for the transmitter or the receiver to improve wireless power transfer efficiency. Additionally, the planar antenna and electrodeposited antennas also comprise continuous conductors with no break or radio frequency (RF) discontinuities. The electrodeposited antenna can be deposited on the part of the vehicle, e.g., the floor panel. For example, the transmitter (including the transmitter antennas, can be mounted above the floor panel of the vehicle in an aftermarket application).

In some embodiments, the wireless charging vehicle seat system is fabricated to utilize an isolated switching amplifier system topology where the wireless charging vehicle seat system components are sufficiently isolated to improve overall system performance. For example, the amplifier in an amplifier printed circuit board (PCB) is attached to a first area of an electrically non-conductive support structure of the vehicle seat, around the vehicle seat, or floor panel of the vehicle (or to a conductive structure with enough isolation using, e.g., RF shielding layers or absorption sheets). The filter in the filter PCB is attached to a second area of the support structure, where the filter in the filter PCB is electrically coupled to the amplifier in the amplifier PCB. The filter receives an amplified signal from the amplifier. One or more capacitors in a resonant capacitor PCB is attached to a third area of the support structure. The resonant capacitors in the resonant capacitor PCB is electrically coupled to the filter(s) and to one or more antennas. The resonant capacitors receive a filtered signal from the filter(s) and drive the filtered signal(s) onto one or more antennas. To improve performance (e.g., reduce coupling losses, hysteresis losses, switching losses, etc.), the first area, the second area, and the third area of the support structure are selected to maintain a physical separation (e.g., 10 mm or more) between the amplifier PCB, the resonant capacitor PCB, the filter PCB, and the one or more antennas. In some embodiments, the amplifier PCB is coupled to at least one physically separated filter PCB that is coupled to a physically separate resonant capacitor PCB that is coupled to one or many antennas in order to physically separate passive components of the system to reduce switching losses, hysteresis losses, and other losses. The antennas can be three-dimensional antennas as described above, planar antenna, or electrodeposited antennas where the antenna conductor is electrodeposited directly onto the support structure or other mechanical part of the vehicle. Furthermore, a second filter PCB can be included in the system for a differential application where the second filter PCB is coupled differentially to the amplifier PCB and the resonant capacitor PCB. Additionally, the resonant capacitor PCB can be placed in a separate second structure while the amplifier PCB and filter PCB(s) are placed in a first structure in order to reduce the distance between the resonant capacitor PCB and the antennas and thereby reduce the resistance between the antenna and its resonant capacitors. Maintaining the physical separation as described above minimizes or decreases cross-coupling losses, switching losses, hysteresis losses, etc., thereby improving the overall performance of the wireless charging system. In some embodiments, the components of the isolated switching power amplifier system are contained in a modular structure that is embedded into the vehicle seat, floor panel, or other part of the vehicle.

Figure 2:
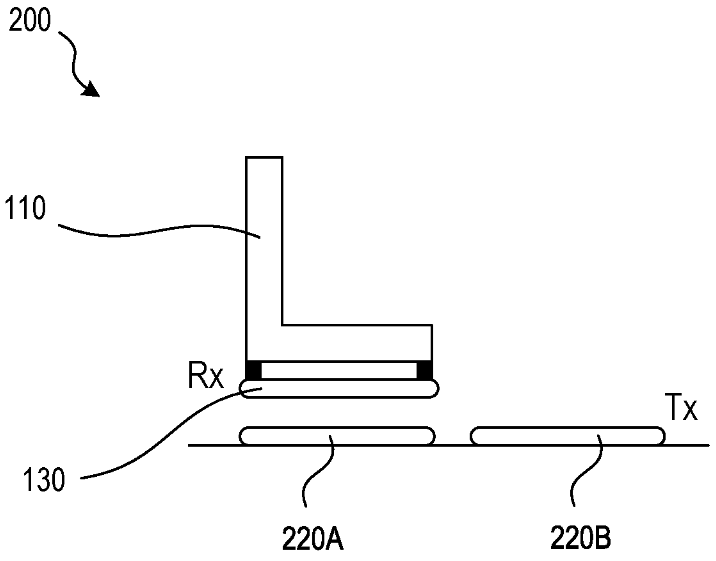
FIG. 2 is a representative illustration of a wireless charging vehicle seat system with multiple transmitter antennas.

FIG. 2 is a representative illustration of a wireless charging vehicle seat system 200 with multiple transmitter antennas in the wireless charging transmitter system. The multiple transmitter antennas 220A and 220B can increase the charging area of the vehicle seat 110. Additionally, the receiver (Rx) 130 can provide power to either the electronics in the vehicle seat directly (e.g., actuators, electronic control unit (ECU), and fans) or to a rechargeable battery (not shown in FIG. 2) that acts as a buffer between the receiver device and the electronic systems in the seat. For example, the rechargeable battery can help with quick peak loads for items that are often not in use but have high power consumption, such as vehicle seat actuators. The number of transmitters in the system can vary depending on the application. For example, it may be desirable to include multiple transmitters in order to increase the charging coverage. Although FIG. 2 visually illustrates an example embodiment of two transmitters, it may be desirable to include three or more transmitters. Additionally, or alternatively, the system can include two or more transmitter antennas driven by the same amplifier system.

Figure 3:
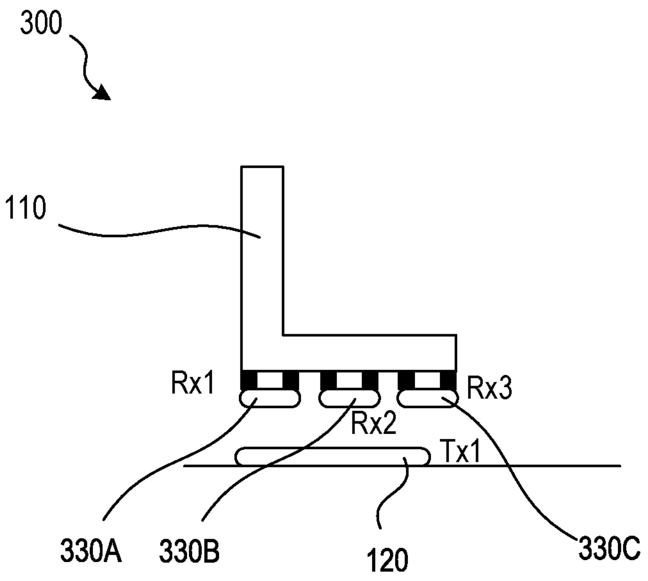
FIG. 3 is a representative illustration of a wireless charging vehicle seat system with multiple receiver antennas.

FIG. 3 is a representative illustration of a wireless charging vehicle seat system 300 with multiple receiver antennas. The multiple receiver antennas 330A, 330B, and 330C can allow the wireless charging system 300 to charge multiple electronic systems, such as sensors and fans, that are in various positions or orientations in the seat. This can also be beneficial from a cost and implementation perspective because the types of electronics in vehicle seats may vary. Furthermore, it may be desirable to include multiple receiver antennas to improve the coupling between the transmitter and the receiver at various distances from the transmitter.

In some embodiments, multiple transmitter antennas in the vehicle's floor panel (e.g., transmit antennas 220A and 220B in FIG. 2) can be combined with multiple receiver antennas in the vehicle seat (e.g., receive antennas 330A, 330B, and 330C in FIG. 3).

Figure 4:
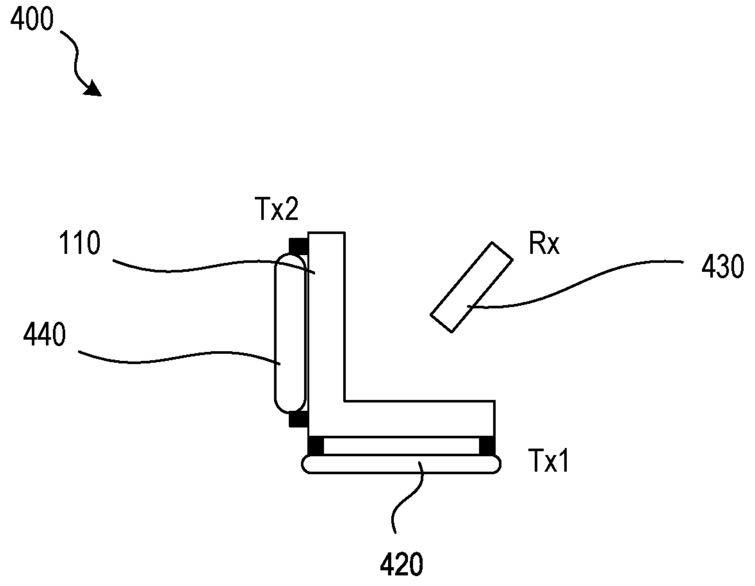
FIG. 4 is a representative illustration of a wireless charging vehicle seat system for charging passenger devices.

FIG. 4 is a representative illustration of a wireless charging vehicle seat system 400 for charging passenger devices rather than the electronics in the vehicle seat. For example, charging wireless electronic devices untethered from the vehicle seat (e.g., held by passenger located in front of, on, or behind the seat). In one embodiment, the wireless charging car system 400 includes two transmitter antennas: a transmitter antenna (Tx1) 420 underneath the seat or in the bottom seat cushion of vehicle seat 110, and transmitter antenna (Tx2) 440 in the back of vehicle seat 110 (e.g., behind or inside a back support portion of the vehicle seat). By having these two antennas embedded on the vehicle seat 110 approximately orthogonally to each other, a receiver device 430 can achieve greater three-dimensional freedom. In this embodiment, it may be beneficial to place the transmitter antennas (Tx1 420 and Tx2 440) in front of the metal frame (e.g., steel frame) of the seat rather than in the injection molded plastic behind or underneath the seat. This is so the metal frame of the seat does not block the magnetic flux from permeating to the passenger devices. Furthermore, in order to avoid obstruction by the metal frame and other parts in the vehicle seat, improve the intrinsic quality of the antennas, or increase the amount of flux permeating to the receiver device, the antennas can be embedded into the seat cushions directly. The wireless charging vehicle seat system illustrated in FIG. 4 can be a single transmitter system or a multiple transmitter system. That is, the system of FIG. 4 can include only Tx1, only Tx2, or both transmitters Tx1 and Tx2. Furthermore, Tx1 and Tx2 can be separate transmitter antennas driven by the same power amplifier.

The power amplifier can be a switching amplifier, such as a series or parallel resonant or off-resonant Class D or Class E amplifier. Additionally, the power amplifier can be single-ended or differential, and can comprise an isolated switching amplifier topology. In a parallel-tuned power amplifier, the load network and matching network are tuned such that the transmitter antenna is in parallel rather than in series to the resonant capacitor with the load network of the amplifier also tuned at the same resonant frequency. That is, the entire power amplifier network operates completely in resonance rather than using an off-resonant load network. This way, the voltage across the transmitter is maximized and harmonics are reduced. By maximizing the voltage, there is higher oscillating current flowing through the transmitter antenna or a stronger magnetic field to be coupled with the receiver, especially in a loose coupling resonant inductive system, such as when the transmitter and receiver are physically far apart. In some embodiments, a transformer can also be included to further increase the oscillating voltage across the transmitter antenna and thereby further improve the flux linkage and power delivery between the transmitter and receiver. Additionally, the parallel resonant power amplifier is better protected from movements or changes in the position of the receiver or capacitive and inductive reflections from the surrounding environment that could cause a substantial change in the efficiency of the power amplifier.

Wireless charging vehicle seat system 400 can also charge receiver devices located behind the vehicle seat 110. This is especially important for Tx2 440 and may be a more applicable use case of Tx2 in the system for mobile device charging (e.g., charging mobile phones) since the direction of the flux from the transmitter is more aligned with the back of the mobile device where the receiver is likely to be located. In the current position of Rx in system 400, the front of the mobile device is angled and possibly parallel to Tx2. This is likely the case when the passenger is using the mobile device while sitting in the car seat or vehicle seat. Therefore, the Rx antenna is likely behind the mobile device in typical electronic devices, making the Tx2 antenna better positioned for receivers behind the vehicle seat rather than in front of the vehicle seat. Therefore, Tx1 and Tx2 can be potentially implemented for the purpose of charging passenger devices in both the front and the back of the vehicle seat.

The transmitter antenna and the receiver antenna can both planar antennas, electrodeposited antennas formed directly onto a vehicle seat part or floor panel, or three-dimensional antennas. A three-dimensional antenna, for example, can be particularly suited for the transmitter and/or receiver antennas of system 400 because of the loose coupling between the receiver and the transmitter antennas. Furthermore, it may also be desirable to include a high permeability material, such as a ferrite sheet, between the transmitter and a conducting surface of the vehicle (e.g., the metal within vehicle seat). This may further improve the performance of the transmitter antenna(s) in the system.

Figure 5:
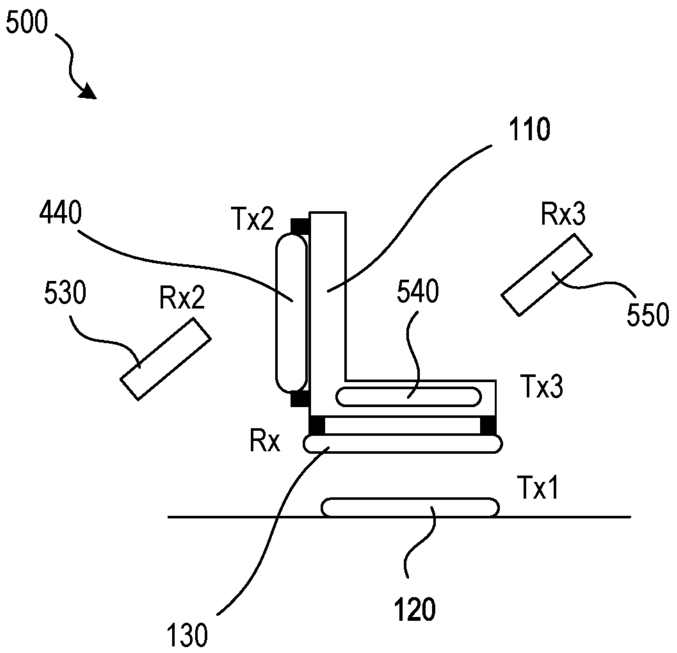
FIG. 5 is a representative illustration of a wireless charging vehicle seat system for charging vehicle electronics and passenger devices.

FIG. 5 is a representative illustration of a wireless charging vehicle seat system 500 for charging vehicle electronics and passenger devices. In wireless charging vehicle seat system 500, the transmitter (Tx1) 120 in the floor panel in the vehicle emits a safe magnetic field that is captured by the receiver 130 in the vehicle seat 110. This receiver (Rx) 130 can include an AC to DC converter to provide power to various vehicle seat electronic systems, such as sensors, fans, actuators, etc., or can include a battery as a buffer for peak current requirements of the vehicle seat electronics and/or the transmitter(s) Tx2 and Tx3.

The wireless charging vehicle seat system 500 includes a transmitter (Tx3) 540 in the vehicle seat cushion to charge passenger electronic devices for passengers in the vehicle seat 110 (e.g., to charge electronic device RX3 550). The vehicle seat system 500 also includes a transmitter (Tx2) 440 embedded on the back of the vehicle seat 110 to charge electronic devices of passengers sitting behind vehicle seat 110 (e.g., for the passengers to charge their mobile devices while they are using them, for example, to watch online movies on Netflix or YouTube). The transmitters (Tx3) 540 and (Tx2) 440 can be powered by the receiver (Rx) 130 or by a rechargeable battery buffer that receiver Rx 130 is electrically connected to.

In the representative embodiment illustrated in FIG. 5, transmitters (Tx2) 440 and (Tx3) 540 include an antenna and amplifier that generates a safe magnetic field that Receiver (Rx2) 530 or Receiver (Rx3) 550 can capture. Receiver (Rx2) 530 and (Rx3) 550 can be, for example, a smartphone or tablet receiver. In some embodiments, the bottom seat cushion of seat 110 can include both a receiver and transmitter antenna or a single antenna that can act as both a transmitter and a receiver for charging a passenger device (e.g., a passenger device receiver (Rx3) 550).

Wireless charging vehicle seat system 500 can include multiple receiver antennas (e.g., receive antennas 330A, 330B, and 330C in FIG. 3), and multiple transmitter antennas (e.g., transmit antennas 220A and 220B in FIG. 2). The power amplifiers in the wireless charging vehicle seat system 500 can be switching amplifiers, such as a series or parallel resonant or off-resonant Class D or Class E amplifiers. The power amplifier can also be single-ended or differential and can be based on an isolated switching amplifier topology.

Figure 6:
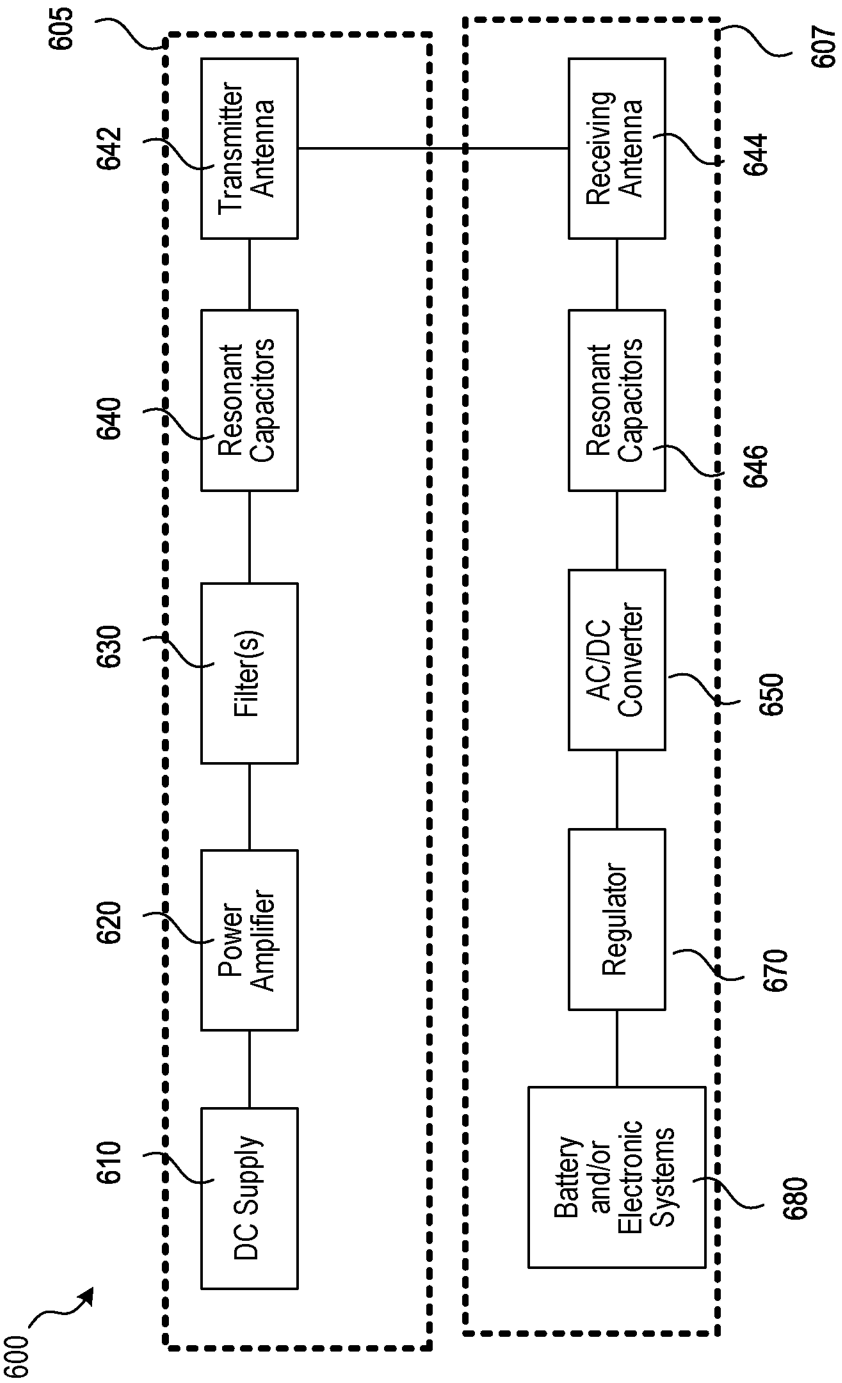
FIG. 6 is a representative block diagram of a wireless charging vehicle seat system.

FIG. 6 is a representative block diagram of a wireless charging vehicle seat system 600 (e.g., the vehicle seat system of FIG. 1). The system 600 is a simplified representation of the wireless charging vehicle seat system including a DC supply 610 (e.g., vehicle power source), a power amplifier 620, radio frequency (RF) filters 630, transmit resonant capacitors 640, transmit antenna(s) 642, receive antenna(s) 644, receiver resonant capacitors 646, alternating current to direct current (AC/DC) converter 650 (e.g., a rectifier circuit), a regulator 670, and battery or electronic system to be charged 680. The transmit resonant capacitors 640 and receiver resonant capacitors 646 are the matching network necessary to substantially excite the transmitter antenna 642 and receiver antenna 644 (respectively) at resonance. The regulator 670 is configured to maintain a constant output voltage. The constant output voltage is used, e.g., to power vehicle seat electronics or to charge a battery (e.g., a batter used by vehicle seat electronics). In some embodiments, the receiver chain 607 is embedded in an electronic device (e.g., a mobile electronic device such as a phone) or is a separate wireless charging receiver accessory (e.g., a wireless charging apparatus in a phone case).

In some embodiments, the transmitter chain 605, the receiver chain 607, or both, can include isolated components to provide for operational and thermal stability. For example, components of the transmitter chain 605, such as amplifier PCBs (containing amplifier 620), filter PCBs (containing filters 630) and resonant capacitor PCBs (containing resonant capacitors 640), and antennas can be physically isolated from each other (e.g., by at least 10 mm as described in the Isolated Switching Amplifier embodiments described in U.S. patent application Ser. No. 62/985,692).

In some embodiment, the amplifier 620 can be a switching amplifier including a single-ended or differential parallel-resonant or off-resonant Class D or E amplifier.

In some embodiments, the amplifier 620 can be capacitively tuned because the movement of the seat can cause reflections back to the amplifier to increase or decrease. These reflections occur because, as the seat moves, the coupling between the transmitter (e.g., represented by transmitter chain 605) and the receiver (e.g., represented by receiver chain 607) changes with the increase or decrease in separation distance and angular positioning. For example, the change in separation distance or orientation between the transmitter and receiver can occur by using the seat position and angle/recline actuators in a vehicle seat. These reflections can shift the targeted or optimal performance points and create more thermal stress on the switching components of the amplifier, for example, where the reflections cause a greater overlap in current and voltage waveforms in zero-voltage-switching (ZVS) amplifier topologies, such as Class E and Class D amplifiers. In some embodiments, the amplifier 620 can be capacitively tuned using the feedback system described in relation to FIG. 7.

Figure 7:
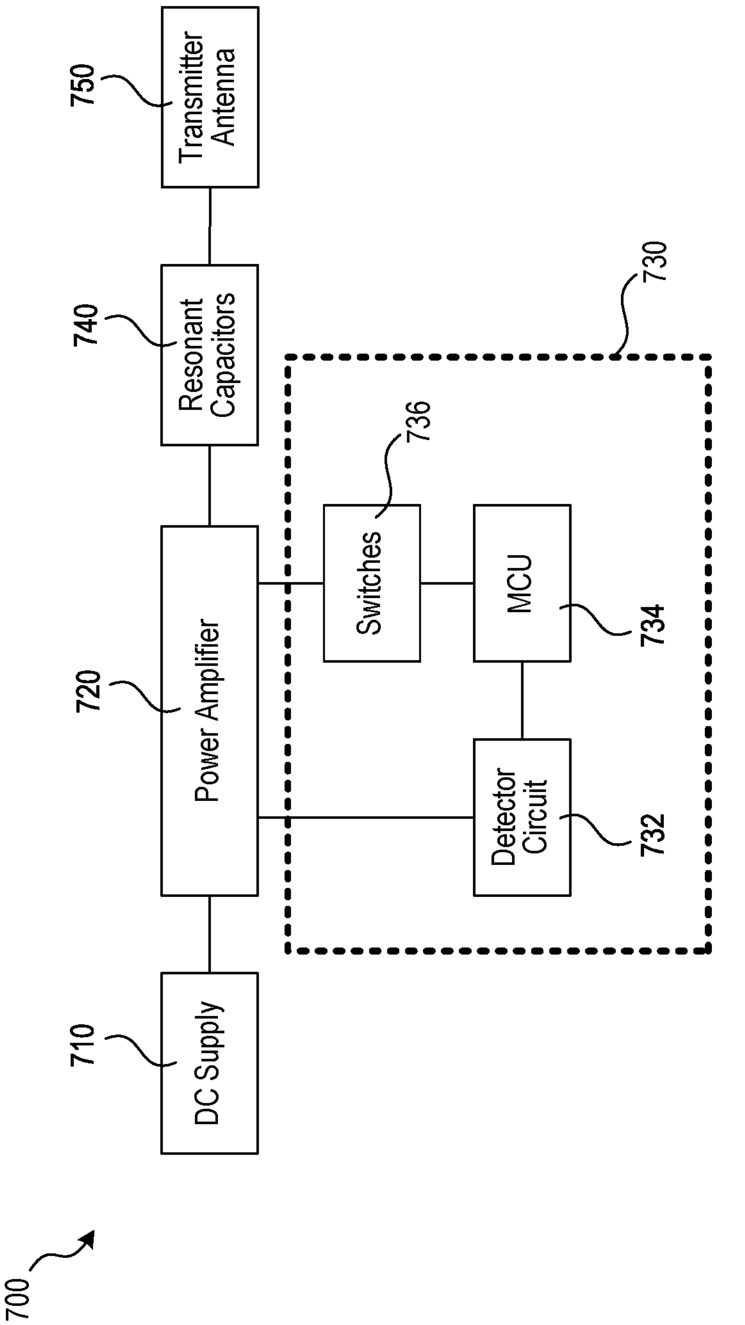
FIG. 7 is a representative block diagram of a transmitter for a wireless charging vehicle seat system.

FIG. 7 is a representative block diagram of a transmitter 700 for a wireless charging vehicle seat system (e.g., wireless charging vehicle seat system 100 in FIG. 1). A feedback system 730 can be coupled to the wireless charging transmitter where a detector circuit 732 (e.g., a peak detector circuit and a voltage divider), monitors an internal signal in a power amplifier 720 (e.g., measures the drain voltage of a switching transistor in the power amplifier) and provides the monitored signal (e.g., voltage or current) to a controller 734 (e.g., a microcontroller (MCU) or other control unit). The controller 734 is configured to adjust one or more properties of the power amplifier 720 in response to the monitored signal. For example, the controller 734 can capacitively tune the power amplifier in response to movement or tilt of a vehicle seat resulting in changes to the monitored signal.

For example, in some embodiments, the controller 734 is programmed (e.g., pre-programmed before operation of the wireless charging transmitter) to adjust shunt capacitors (e.g., increasing or decreasing a total capacitance value of one or more shunt capacitors) in the power amplifier 720 based on a peak voltage or a drain-to-source voltage ratio of a switching transistor in the power amplifier 720. That is, for switched power amplifiers, such as Class D or Class E, differential or single-ended, series-resonant or parallel-resonant amplifiers, the controller 734 can adjust the value of the shunt capacitor coupled between source node and the drain node of the main switching transistor. The controller 734 can adjust the value of the shunt capacitors by enabled or disabling (e.g., turning on or off) electrical, mechanical, or electromechanical switches to enable or disable series or parallel capacitors making up the shunt capacitor.

In some embodiments, the detector circuit 732 can include a peak detector circuit and a voltage divider. The peak detector circuit can be a current-limiting resistor coupled to the drain voltage of the switching transistor and coupled in series with a diode and a parallel capacitor. The output of the peak detector circuit can be electrically coupled to the controller 734 through a voltage divider, a bypass capacitor, and an operational amplifier (op amp) acting as an impedance buffer. If the signal monitored by the detector circuit 732 is above a threshold (e.g., if the measured voltage is higher than a predetermined/pre-programmed voltage level), the controller 734 can enable more capacitors to increase the shunt capacitor value (e.g., by enabling switches coupled to capacitor arrays). Conversely, if the signal monitored by the detector circuit 732 is below a threshold (e.g., if the measured voltage is lower than a predetermined/pre-programmed voltage level), the controller 734 can decrease the shunt capacitor value by removing capacitors (e.g., by disabling switches in the capacitor array). For differential power amplifiers, two peak detector circuits can be used to measure the drain voltages of both switching transistors in the power amplifier circuit. It will be appreciated that any of the wireless charging vehicle seat systems described in relation to FIGS. 1-5 can be capacitively tuned as described above in relation to FIGS. 6 and 7. The feedback system described in FIG. 7 can be used more generally for switching amplifier applications where it is important to adjust dynamically to potential changes to reflections.

Figure 8A:
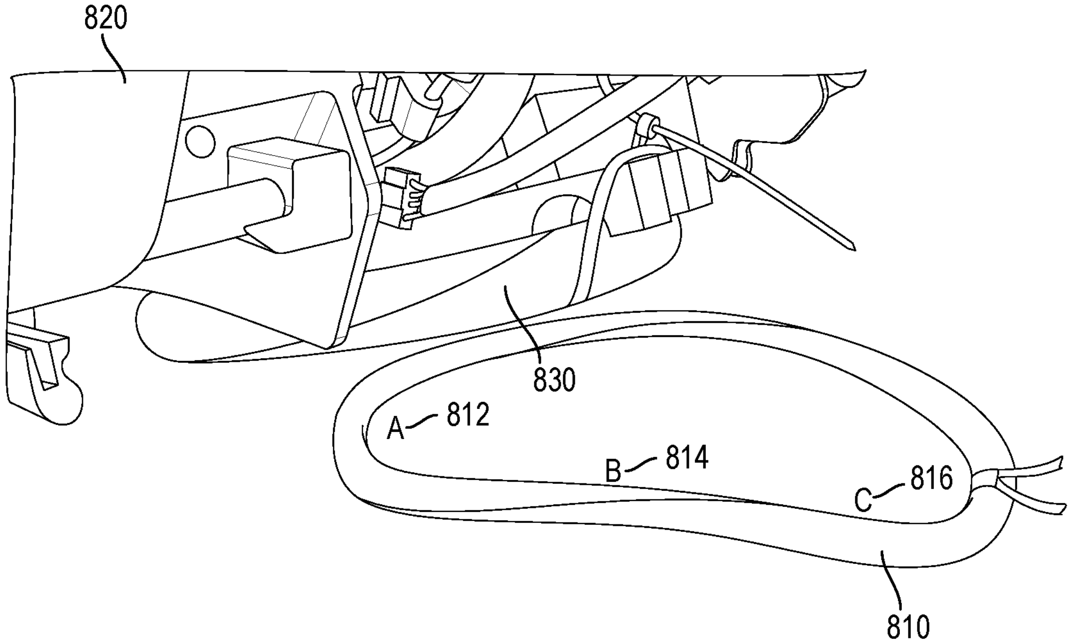
FIG. 8A is a representative illustration of a wireless charging vehicle seat system showing an example placement of transmitter and receiver antennas.

FIG. 8A is a representative illustration of a wireless charging vehicle seat system (e.g., wireless charging vehicle seat system 100 in FIG. 1) showing a transmitter antenna 810 and a receiver antenna 830 mounted to the bottom of a vehicle seat 820. FIG. 8A depicts an example placement of transmitter antenna 810 (e.g., on floor of vehicle under the vehicle seat) and receiver antenna 830 inside or under the vehicle seat and positioned to fully or partially overlap with the transmitter antenna.

In some embodiments, the transmitter antenna 810 can be curved, bowed, or bent as illustrated in FIG. 8A. The curvature of the transmitter antenna can increase the electromagnetic induction on the receiver antenna 830 at a further offset distance compared with a transmitter antenna without the curvature shown in FIG. 8A. The increased electromagnetic induction is desirable, for example, where the receiver antenna in or under the vehicle seat does not fully overlap (e.g., only partially overlaps) the transmitter antenna 810). In such applications without full overlap of transmitter and receiver antennas, it is desirable to have greater power received in areas or regions where the vehicle seat receiver antenna and the transmitter antenna do not overlap or only partially overlap. In some embodiments, the transmitter antenna 810 can be bowed by around 20 degrees (e.g., a degree of curvature of 10 degrees or more). That is, section A 812 in transmit antenna 810 and section C 816 are at the same level and section B 814 is raised above sections A and C such that the central angle to the ends of an arc defined by AC is around 10 degrees or more in the vertical direction (i.e., direction towards the receiver antenna 830). The bow or bend in the curvature of the transmitter antenna can be applied to three-dimensional antennas or to planar antennas (e.g., electrodeposited antennas) with the goal of improving the flux distribution at further distances (relative to antenna embodiments without the bend or bow).

In some embodiments, a high permeability material, such as a ferrite sheet, can be inserted between the transmitter antenna 810 or receiver antenna 830 and conducting structures (e.g., metal) within the vehicle or vehicle seat 820. This can be particularly beneficial for the transmitter antenna 810 because of the vehicle's metal frame. For example, in an aftermarket application, the transmitter antenna 810 can be mounted in a plastic enclosure above the floor panel carpet which is directly above the metal frame of the vehicle. Consequently, a layer of high permeability material, such as a ferrite sheet, can be helpful if placed between the transmit antenna enclosure and the carpet. In other embodiments where the transmitter antenna 810 is integrated into the vehicle rather than being available as an aftermarket accessory, it can also be helpful to have a layer of high permeability material between the transmitter antenna and nearby metal mechanical parts of the vehicle. The high permeability material can better improve the intrinsic quality of the antenna in the vehicle seat environment and reduce thermal stress on amplifier components.

In some embodiments, the receiver antenna 830 can be mounted to the bottom of the vehicle seat 820 at an angle which can improve the received power at an offset distance (i.e., the angular mounting can provide a higher power at a further lateral distance as compared to horizontal mounting). The mounting angle can be geared towards the specific application, for example, based on the amount of physical clearance between the vehicle floor and the bottom of the vehicle seat (or based on the degree of overlap available between the transmitter antenna 810 and receiver antenna 830). In some embodiments, the receiver antenna 830 can be mounted to the bottom of the vehicle seat 820 at an angle between 0 to 180 degrees. U.S. patent application Ser. No. 15/759,473 (Publication No. US2018/0262050), incorporated herein by reference in entirety, describes some examples of coil configurations that can be used for the transmitter and receiver antennas in the automotive car charging systems described herein.

Figure 8B:
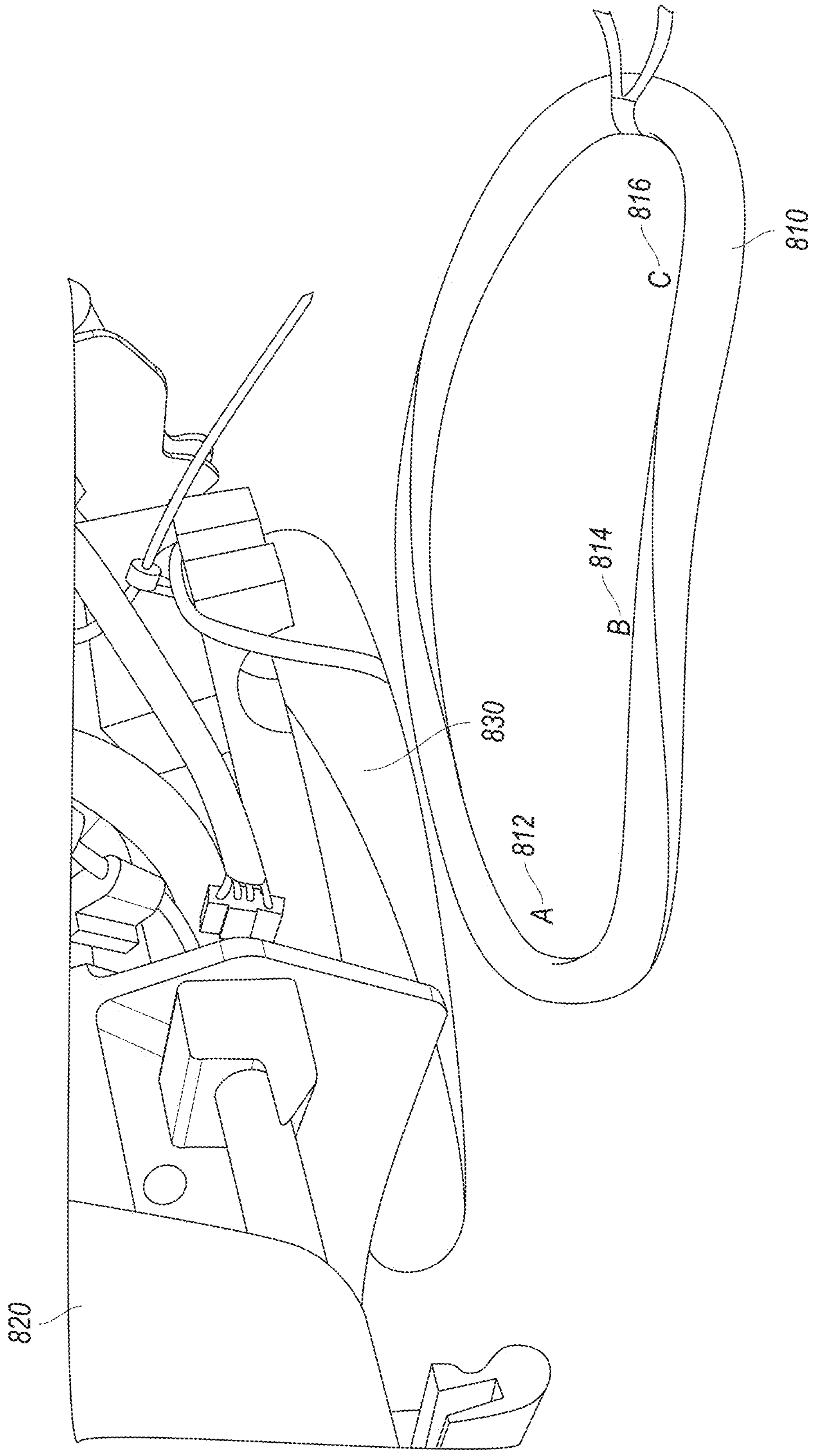
FIG. 8B shows a photograph of a prototype wireless charging vehicle seat system.

FIG. 8B is a photograph of a prototype built consistent with the disclosed design techniques. Due to the underplacement of a pad (which is not a part of the charging system), the bow-shaped nature of the coil is more pronounced in this view, both at the near end (below reference numeral 814) and at the diametrically opposite end. As depicted, the transmitter antenna may touch the underside at the two diametrically opposite points, while may be curved upwards so that the maximal points are diametrically opposite and are 90 degrees apart from the locations that are coplanar with the underside (e.g., touching the pad in FIG. 8B).

A listing of solutions that is preferably implemented by some embodiments can be described using the following clauses.

Clause 1. A wireless charging system for a vehicle seat of a vehicle, comprising: a first transmitter coupled to a power source of the vehicle, wherein the first transmitter comprises an amplifier coupled to one or more transmitter antennas; a first receiver embedded in the vehicle seat of the vehicle, wherein the first receiver comprises one or more receiver antennas wirelessly coupled to the one or more transmitter antennas to receive power wirelessly from the first transmitter; a rectifier circuit coupled to the one or more receiver antennas, wherein the rectifier circuit is configured to convert an alternating current to a direct current; and, a regulator circuit coupled to the rectifier circuit, wherein the regulator circuit is configured to generate a constant output voltage.

Clause 2. The wireless charging system of clause 1, wherein at least one of the one or more transmitter antennas or at least one of the one or more receiver antennas comprises a planar antenna, an electrodeposited antenna, or a three-dimensional antenna.

Clause 3. The wireless charging system of clause 2, wherein the electrodeposited antenna comprises a continuous conductor with no breaks or radio frequency discontinuities deposited directly on a floor panel or a vehicle part embedded into the vehicle.

Clause 4. The wireless charging system of clause 2, wherein the three-dimensional antenna comprises a surface spiral coil comprising a continuous conductor with no breaks or radio frequency discontinuities wound around a dielectric material at an angle to diminish a proximity effect at an operating frequency of the wireless charging system, and to maintain a high intrinsic quality factor (Q) of the surface spiral coil at the operating frequency.

Clause 5. The wireless charging system of clause 1, wherein the regulator circuit is configured to provide at least one regulated output to at least one of an electronic device disposed in the vehicle seat or a rechargeable battery.

Clause 6. The wireless charging system of clause 1, further comprising one or more additional receivers, wherein the first receiver and the one or more additional receivers are configured to provide power to one or more electronic devices embedded in the vehicle seat.

Clause 7. The wireless charging system of clause 1, wherein the first transmitter is disposed above a floor panel of the vehicle.

Clause 8. The wireless charging system of clause 1, wherein a degree or curvature of at least one of the one or more transmitter antennas is at least 10 degrees.

Clause 9. The wireless charging system of clause 1, wherein at least one receiver antenna of the one or more receiver antennas is disposed under the vehicle seat at an angle between 0 degrees and 180 degrees.

Clause 10. The wireless charging system of clause 1, wherein at least one of the first transmitter or the first receiver comprises a ferrite sheet disposed between a conducting surface of the vehicle and the first transmitter or the first receiver.

Clause 11. The wireless charging system of clause 1, wherein the amplifier comprises at least one of a Class D amplifier or a Class E amplifier.

Clause 12. The wireless charging system of clause 1, wherein the first transmitter comprises: an amplifier printed circuit board (PCB), wherein the amplifier is contained in the amplifier PCB; one or more filters contained in a filter PCB, wherein the filter PCB is physically separate from the amplifier PCB; and, one or more resonant capacitors contained in a resonant capacitor PCB, wherein the resonant capacitor PCB is physically separate from the filter PCB and the amplifier PCB.

Clause 13. The wireless charging system of clause 1, further comprising:

a second transmitter disposed within a back support portion of the vehicle seat and configured to wirelessly transfer power to one or more passenger devices positioned behind the vehicle seat, wherein the second transmitter is powered by the first receiver.

Figure 9:
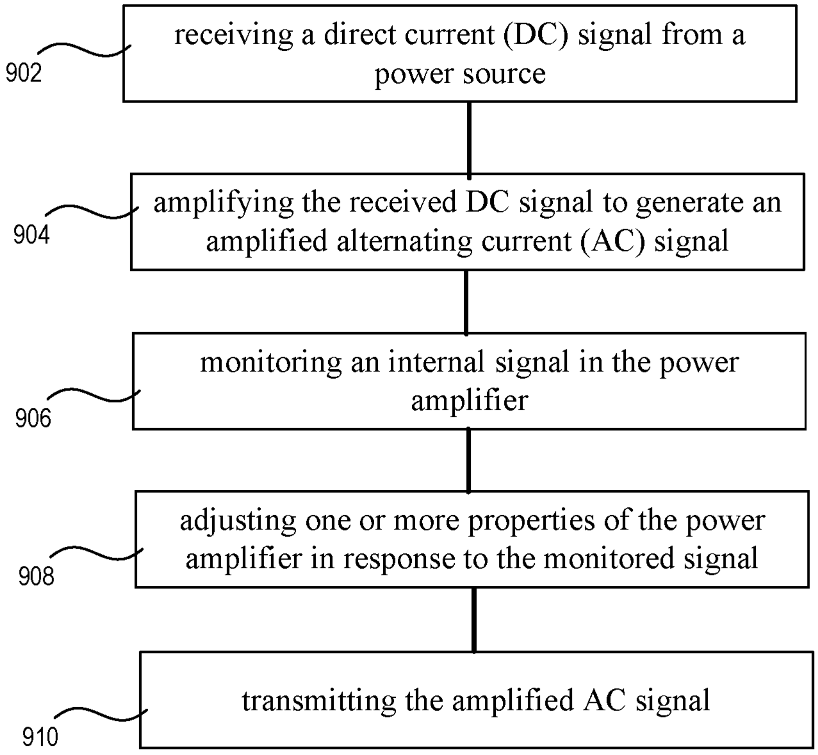
FIG. 9 is a flowchart of an example method for wireless charging electronic devices in a vehicle.

Clause 14. A method (e.g., as depicted in FIG. 9) for wirelessly charging one or more electronic devices in a vehicle, the method comprising: receiving (902) a direct current (DC) signal from a power source; amplifying (904), by a switching power amplifier, the received DC signal to generate an amplified alternating current (AC) signal; monitoring (906), by a detector circuit, an internal signal in the power amplifier; adjusting (908), by a controller, one or more properties of the power amplifier in response to the monitored signal; and, transmitting (910), by one or more transmitter antennas, the amplified AC signal.

Clause 15. The method of clause 14, wherein monitoring an internal signal in the power amplifier comprises measuring a drain voltage of a switching transistor in the power amplifier.

Clause 16. The method of clause 14, wherein adjusting one or more properties of the power amplifier in response to the monitored signal comprises increasing or decreasing a value of one or more shunt capacitors coupled between a source node and a drain node of a switching transistor in the power amplifier in response to the internal signal monitored by the detector circuit being above or below a threshold level pre-programmed in the controller.

Clause 17. The method of clause 14, wherein adjusting one or more properties of the power amplifier in response to the monitored signal comprises enabling one or more switches coupled to a capacitor array to increase a value of a shunt capacitor coupled between a source node and a drain node of a switching transistor of the power amplifier in response to a voltage monitored by the detector circuit being above a voltage level pre-programmed in the controller.

Clause 18. The method of clause 14, wherein the switching power amplifier comprises a differential amplifier, and the detector circuit comprises a first and a second peak detector circuit, wherein the first peak detector circuit is configured to measure a voltage between a first source node and a first drain node of a first switching transistor of the power amplifier, and the second peak detector circuit is configured to measure a voltage between a second source node and a second drain node of a second switching transistor of the power amplifier.

Clause 19. A wireless charging system for a vehicle seat of a vehicle, comprising: a transmitter coupled to a power source of the vehicle, wherein the transmitter comprises an amplifier coupled to one or more transmitter antennas, and, wherein the transmitter is configured to wirelessly charge one or more electronic devices.

Clause 20. The wireless charging system of clause 19, wherein the transmitter is embedded in a vehicle seat cushion.

Clause 21. The wireless charging system of clause 19, wherein the transmitter is disposed on a bottom of a vehicle seat.

Clause 22. The wireless charging system of clause 19, wherein at least one of the one or more transmitter antennas comprises a planar antenna, an electrodeposited antenna, or a three-dimensional antenna.

Clause 23. The wireless charging system of clause 19, further comprising:

a second transmitter disposed within a back support portion of the vehicle seat and configured to wirelessly transfer power to one or more electronic devices.

Clause 24. The wireless charging system of clause 23, wherein the one or more electronic devices comprise wireless devices untethered from the vehicle seat.

Remarks

The figures and above description provide a brief, general description of a suitable environment in which the invention can be implemented. The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations can perform routines having steps/blocks, or employ systems having blocks, in a different order, and some processes or blocks can be deleted, moved, added, subdivided, combined, or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further any specific numbers noted herein are only examples: alternative implementations can employ differing values or ranges.

These and other changes can be made to the invention in light of the above Detailed Description. While the above description describes certain examples of the invention, and describes the best mode contemplated, no matter how detailed the above appears in text, the invention can be practiced in many ways. Details of the system can vary considerably in its specific implementation, while still being encompassed by the invention disclosed herein. As noted above, terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

The invention claimed is:

1. A wireless charging system for a vehicle seat of a vehicle, comprising:

a first transmitter coupled to a power source of the vehicle, wherein the first transmitter comprises an amplifier coupled to one or more resonant capacitors and one or more transmitter antennas, wherein the amplifier is disposed on an amplifier printed circuit board (PCB), wherein the one or more resonant capacitors are disposed on a resonant capacitor PCB, and wherein the amplifier PCB is physically separate from the resonant capacitor PCB;

a first receiver embedded in the vehicle seat of the vehicle, wherein the first receiver comprises one or more receiver antennas wirelessly coupled to the one or more transmitter antennas to receive power wirelessly from the first transmitter;

a rectifier circuit coupled to the one or more receiver antennas, wherein the rectifier circuit is configured to convert an alternating current to a direct current; and a regulator circuit coupled to the rectifier circuit, wherein the regulator circuit is configured to generate a constant output voltage.

2. The wireless charging system of claim 1, wherein at least one of the one or more transmitter antennas or at least one of the one or more receiver antennas comprises a planar antenna, an electrodeposited antenna, or a three-dimensional antenna.

3. The wireless charging system of claim 2, wherein the electrodeposited antenna comprises a continuous conductor with no breaks or radio frequency discontinuities deposited directly on a floor panel or a vehicle part embedded into the vehicle.

4. The wireless charging system of claim 2, wherein the three-dimensional antenna comprises a surface spiral coil comprising a continuous conductor with no breaks or radio frequency discontinuities wound around a dielectric material at an angle to diminish a proximity effect at an operating frequency of the wireless charging system, and to maintain a high intrinsic quality factor (Q) of the surface spiral coil at the operating frequency.

5. The wireless charging system of claim 1, wherein the regulator circuit is configured to provide at least one regulated output to at least one of an electronic device disposed in the vehicle seat or a rechargeable battery.

6. The wireless charging system of claim 1, further comprising one or more additional receivers, wherein the first receiver and the one or more additional receivers are configured to provide power to one or more electronic devices embedded in the vehicle seat.

7. The wireless charging system of claim 1, wherein the first transmitter is disposed above a floor panel of the vehicle, and/or wherein the amplifier comprises at least one of a Class D amplifier or a Class E amplifier.

8. The wireless charging system of claim 1, wherein a degree or curvature of at least one of the one or more transmitter antennas is at least 10 degrees, and/or wherein at least one receiver antenna of the one or more receiver antennas is disposed under the vehicle seat at an angle between 0 degrees and 180 degrees.

9. The wireless charging system of claim 1, wherein at least one of the first transmitter or the first receiver comprises a ferrite sheet disposed between a conducting surface of the vehicle and the first transmitter or the first receiver.

10. The wireless charging system of claim 1, wherein the first transmitter comprises:

one or more filters contained in a filter PCB, wherein the filter PCB is physically separate from the amplifier PCB.

11. The wireless charging system of claim 1, further comprising:

a second transmitter disposed within a back support portion of the vehicle seat and configured to wirelessly transfer power to one or more passenger devices positioned behind the vehicle seat, wherein the second transmitter is powered by the first receiver.

12. A wireless charging system for a vehicle seat of a vehicle, comprising:

a transmitter coupled to a power source of the vehicle, wherein the transmitter comprises an amplifier coupled to one or more transmitter antennas, wherein the transmitter is configured to wirelessly charge one or more electronic devices, and wherein the amplifier is disposed on an amplifier printed circuit board (PCB); and one or more resonant capacitors coupled to the amplifier, wherein the one or more resonant capacitors are disposed on a resonant capacitor PCB, and wherein the resonant capacitor PCB is physically separate from the amplifier PCB.

13. The wireless charging system of claim 12, wherein the transmitter is embedded in a vehicle seat cushion and/or disposed on a bottom of the vehicle seat.

14. The wireless charging system of claim 12, wherein at least one of the one or more transmitter antennas comprises a planar antenna, an electrodeposited antenna, or a three-dimensional antenna.

15. The wireless charging system of claim 12, further comprising:

a second transmitter disposed within a back support portion of the vehicle seat and configured to wirelessly transfer power to the one or more electronic devices, wherein the one or more electronic devices comprise wireless devices untethered from the vehicle seat.

* * * * *